No. 679,060. Patented July 23, 1901.
J. McCAFFREY.
HUB FOR FRICTION CLUTCHES.
(Application filed Feb. 25, 1901.)
(No Model.)

Witnesses:
Wm. H. Varnum
Alice J. Rice

Inventor:
John McCaffrey
by Henry J. Miller
atty.

THE NORRIS PETERS CO., PHOTO-LITHO., WASHINGTON, D. C.

UNITED STATES PATENT OFFICE.

JOHN McCAFFREY, OF LAWRENCE, MASSACHUSETTS.

HUB FOR FRICTION-CLUTCHES.

SPECIFICATION forming part of Letters Patent No. 679,060, dated July 23, 1901.

Application filed February 25, 1901. Serial No. 48,656. (No model.)

*To all whom it may concern:*

Be it known that I, JOHN MCCAFFREY, a citizen of the United States, residing at Lawrence, in the county of Essex and State of Massachusetts, have invented certain new and useful Improvements in Hubs for Friction-Clutches and Similar Machines, of which the following is a specification, reference being had therein to the accompanying drawings.

This invention has reference to improvements in hubs for friction-clutches and mechanisms of a similar nature for transmitting power.

One object of the invention is to automatically supply to and maintain a body of lubricant at the bearing of the hub, as well as to the friction-flange thereof.

Another object of the invention is to so construct a hub of this nature that the entrance of water and foreign substances to the lubricant-channels may be prevented.

The invention consists in the conical hub having an annular channel and a series of inclined channels, the lubricant-chamber with which such inclined channels connect the friction-flange, and the openings between the lubricant-chamber and the friction-clutch chamber.

The invention also consists in the construction of the hub with its lubricant channels and chamber and in the thrust-resisting collar having the lubricant-inlets.

The invention also consists in such other novel features of construction and combination of parts as shall hereinafter be more fully described, and pointed out in the claims.

Figure 1:
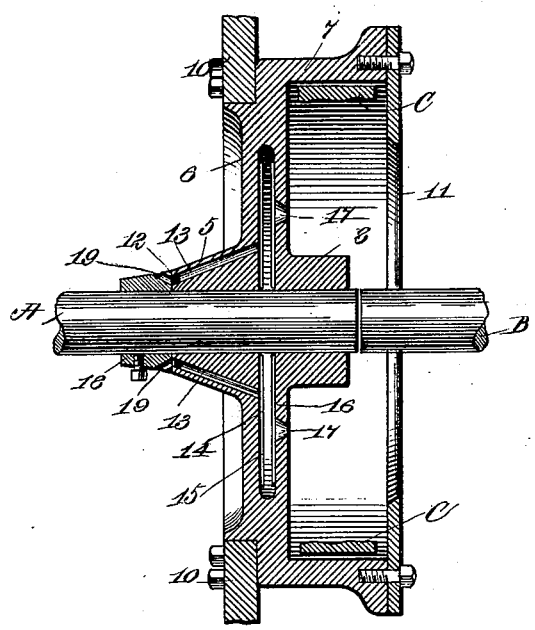
Figure 2:
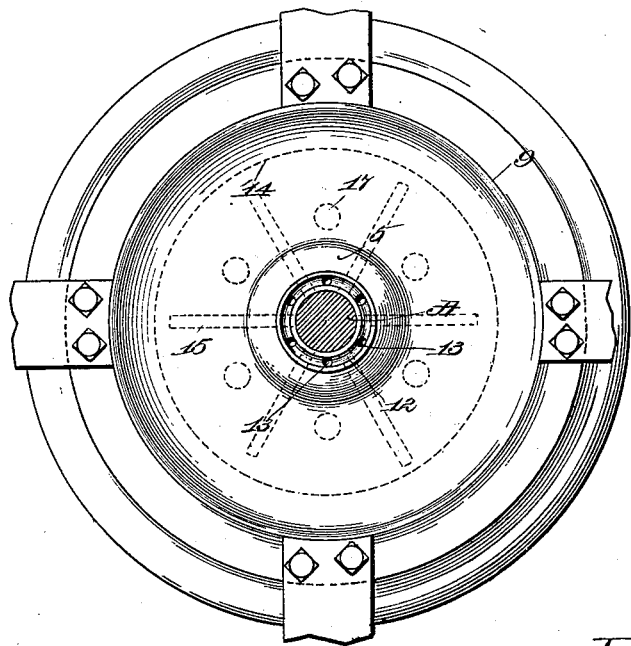

Figure 1 represents a vertical sectional view of the improved hub and the thrust-collar shown in relation to two shafts and with portions of a friction-clutch. Fig. 2 represents an end view of the hub.

Similar characters of reference designate corresponding parts throughout.

In practice it has been found that when the opposing members of friction-clutches are brought into contact the initial resistance of inertia and load to the rotation of the loose member will result in the ultimate grinding into the friction-surface of such member by the opposing face of the moving member to such an extent as to destroy the efficiency of the contacting surfaces. By the provision of a body of lubricant between these surfaces sudden contact is provided, which being quickly overcome by the displacement of the lubricant but momentarily delays the frictional contact between the members and prevents the grinding action.

Where clutches and other rotating pulleys and devices of like nature are required to be operated in damp places or adjacent to sprays and other forms of moving water, it is essential that the mechanisms be thoroughly lubricated, and it is desirable to so lubricate them without stopping the machinery, while preventing the ingress of water to the bearings.

In the drawings, A represents a shaft mounted in any usual bearings, and B a shaft suitably journaled and driven and carrying portions of a friction-clutch of any ordinary construction, of which C C represent portions of the contact members, which are adapted to be brought into frictional engagement with friction-flange of the improved hub. This hub may be of any suitable size and comprises the cone-bearing 5, having a bore to fit the shaft A, the member 6, with its friction flange or rim 7, and the bearing-collar 8, the bore of which corresponds in size and alinement with the bore of the cone 5, the member 6 having also a shoulder 9 or a series of abutments equivalent therefor, against which the arms 10 10 from the pulley-flange may abut, as is shown in Fig. 1 of the drawings. To the edge of the friction-flange 7 is secured the plate 11, which forms an inwardly-extending cover for the friction-chamber, while the opening in this plate permits the connections between the contact members C C and the shaft B to extend therethrough. In the end of the cone 5 is formed the annular groove 12, from which the outwardly-inclined channels 13 13 extend to the reservoir 14, formed in the member 6. This reservoir 14 has the radial ribs 15 and 16, and through its inner wall are formed tapering openings 17 17, connecting the reservoir with the friction-chamber.

For use in damp positions the thrust-collar 18 is furnished, this collar being supplied with a series of inlets 19 19, which extend to points opposite the annular groove 12 of the cone 5, as also with means for securing the collar onto the shaft A. This collar may, however, be dispensed with, or it may be of a diameter less than that of the end of the cone.

While the hub and its connected mechanism are in rotation lubricant supplied through the inlets 19 passes into the groove 12, from whence it is carried by centrifugal action through the channels 13 into the reservoir 14 and, being agitated by the ribs 15 and 16, is distributed over the surfaces of this chamber, a portion passing through the openings 17 into the friction-chamber and lubricating the inner surface of the flange 7. The centrifugal or drawing action of the lubricant in the channels 13 being broken by the groove 12 does not tend to draw moisture in through the inlets 19 of the collar 18. A supply of lubricant having been furnished to the friction-chamber is sustained therein by the plate 11 and is in readiness to lubricate the inner surface of the flange 7 to prevent the initial grinding contact therewith of the members C C.

It is obvious that this hub may be secured to the shaft A when desired to rotate therewith, and it is evident that the diameter of the member 6 may be increased and the periphery of the flange 7 be shaped as a pulley-rim.

Having thus described my invention, I claim as new and desire to secure by Letters Patent—

1. A hub of the nature described comprising a bearing-cone having a diametrically-enlarged member furnished with a lubricant-reservoir, the bearing having an annular groove in its end and inclined channels connecting the groove with the reservoir, and a thrust-collar adapted to cover said groove and having inlets connecting therewith.

2. The combination with the hub having the cone 5 the member 6 with its flange 7 and the bearing 8, the cone 5 having the groove 12 and the channels 13, the member 6 having the reservoir 14, into which said channels 13 open, and furnished with the ribs 15 and 16 and the outlets 17, of the plate 11 secured to the flange 7 and having an open center as and for the purpose described.

3. A hub for friction-clutches and the like comprising the cone 5 centrally disposed on the member 6 and having the annular groove 12 and the inclined channel 13, the member 6 having the reservoir 14, with which the channels 13 connect, and furnished with the flange 7 and with the outlets 17 opening into the chamber formed by said flange, substantially as described.

In testimony whereof I affix my signature in presence of two witnesses.

JOHN McCAFFREY.

Witnesses:
W. STANLEY CAMPBELL,
HENRY J. MILLER.